(12) United States Patent
Jacobs et al.

(10) Patent No.: US 6,534,618 B1
(45) Date of Patent: Mar. 18, 2003

(54) METHODS OF DRYING OPTICAL FIBER COATINGS

(75) Inventors: Gregory F. Jacobs, Elmira, NY (US); Michael J. Winningham, Big Flats, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/723,158

(22) Filed: Nov. 27, 2000

(51) Int. Cl.⁷ ................................................. C08T 18/71
(52) U.S. Cl. ........................... 528/69; 252/194; 34/329; 427/389.7
(58) Field of Search ................................. 427/329, 327, 427/328, 389.7, 372.2; 34/443, 444, 448, 474, 510, 516, 507; 528/69; 252/194

(56) References Cited

U.S. PATENT DOCUMENTS

| | | | |
|---|---|---|---|
| 2,698,260 A | | 12/1954 | Meauze et al. |
| 3,369,957 A | | 2/1968 | Caroselli et al |
| 3,479,325 A | * | 11/1969 | Blomeyer |
| 4,071,639 A | | 1/1978 | Palmer et al. |
| 4,197,344 A | | 4/1980 | Tshudy |
| 4,287,039 A | | 9/1981 | Buethe et al. |
| 4,302,505 A | | 11/1981 | Heberger |
| 4,302,506 A | | 11/1981 | Heberger |
| 4,507,431 A | | 3/1985 | Stutz et al. |
| 4,608,409 A | | 8/1986 | Coady et al. |
| 4,609,718 A | | 9/1986 | Bishop et al. |
| 4,612,228 A | | 9/1986 | Kato et al. |
| 4,645,783 A | | 2/1987 | Kinoshita |
| 4,690,502 A | | 9/1987 | Zimmerman et al. |
| 4,798,746 A | | 1/1989 | Clear et al. |
| 4,798,852 A | | 1/1989 | Zimmerman et al. |
| 4,921,880 A | | 5/1990 | Lee et al. |
| 4,990,552 A | * | 2/1991 | Mori et al. |
| 5,006,578 A | | 4/1991 | Masuda et al. |
| 5,026,743 A | | 6/1991 | Beresford et al. |
| 5,087,645 A | | 2/1992 | Kojima et al. |
| 5,104,433 A | | 4/1992 | Chapin et al. |
| 5,188,864 A | | 2/1993 | Lee et al. |
| 5,281,436 A | | 1/1994 | Swidler |
| 5,366,669 A | | 11/1994 | Quadir et al. |
| 5,478,920 A | * | 12/1995 | Drysdale |
| 5,639,814 A | | 6/1997 | Van Buskirk et al. |
| 5,643,665 A | | 7/1997 | Saidi |
| 5,741,542 A | | 4/1998 | Williams et al. |
| 5,880,173 A | | 3/1999 | Matsuda et al. |
| 6,059,859 A | | 5/2000 | Alvarez, Jr. et al. |
| 6,214,899 B1 | * | 4/2001 | Chawla et al. |
| 2002/0013383 A1 | | 1/2002 | Chawla et al. ................ 522/96 |

FOREIGN PATENT DOCUMENTS

| | | |
|---|---|---|
| CS | 212104 | 2/1982 |
| CS | 247795 | 1/1987 |
| DE | 3144011 | 5/1983 |
| EP | 10318 | 4/1980 |
| EP | 162611 | 11/1985 |
| EP | 216622 | 4/1987 |
| EP | 311906 | 4/1989 |
| EP | 0849296 | 6/1998 |
| EP | 959117 | 11/1999 |
| FR | 1490130 | 7/1967 |
| FR | 2774986 | 8/1999 |
| JP | 47046882 | 11/1972 |
| JP | 48078072 | 10/1973 |
| JP | 49013614 | 4/1974 |
| JP | 49130481 | 12/1974 |
| JP | 51125478 | 11/1976 |
| JP | 51149021 | 12/1976 |
| JP | 52010338 | 1/1977 |
| JP | 53011951 | 2/1978 |
| JP | 53018638 | 2/1978 |
| JP | 53052711 | 5/1978 |
| JP | 56000186 | 1/1981 |
| JP | 56107078 | 8/1981 |
| JP | 59026579 | 2/1984 |
| JP | 58147405 | 9/1984 |
| JP | 60071775 | 4/1985 |
| JP | 60130583 | 7/1985 |
| JP | 61193888 | 8/1986 |
| JP | 62021876 | 1/1987 |
| JP | 63207882 | 8/1988 |
| JP | 63242599 | 10/1988 |
| JP | 63248839 | 10/1988 |
| JP | 01022378 | 1/1989 |
| JP | 02124983 | 5/1990 |
| JP | 02215877 | 8/1990 |
| JP | 03013293 | 1/1991 |
| JP | 03100185 | 4/1991 |
| JP | 03237172 | 10/1991 |

(List continued on next page.)

OTHER PUBLICATIONS

Handbook of Pressure Sensitive Adhesive Technology, 3$^{rd}$ Edition, Warwick, RI 1999 pp. 36,37,57–61, 169, 173, 174 and 609–631.

"Selectivity of the Isocyanate–Hydroxyl Reaction vs Side Reactions as a Function of Catalyst", Blank, W.J., He, Z.A.; Picci, M.E., Gordon Research Conference, Jul. 1999.

Primary Examiner—Rachel Gorr
(74) Attorney, Agent, or Firm—James V. Suggs; Timothy R. Krogh

(57) ABSTRACT

The disclosed invention relates to a method of drying an optical fiber coating. The method includes blending a plurality of raw materials capable of forming an optical fiber coating and dehydrating the plurality. One embodiment of the method includes drying the optical fiber coating by passing a dehydrating medium over a top surface of a body of the plurality of materials. A second embodiment of the invention includes bubbling a dehydrating medium through the body of the plurality of raw materials. In a third embodiment of the invention, the plurality is dehydrated by reacting the water in the plurality with a dehydrating medium that includes a compound having a functional group that is capable of reacting with the water.

11 Claims, 1 Drawing Sheet

FOREIGN PATENT DOCUMENTS

| | | |
|---|---|---|
| JP | 512540 | 11/1992 |
| JP | 04325569 | 11/1992 |
| JP | 04325570 | 11/1992 |
| JP | 04331207 | 11/1992 |
| JP | 07082456 | 9/1993 |
| JP | 05271460 | 10/1993 |
| JP | 06001960 | 1/1994 |
| JP | 06010189 | 1/1994 |
| JP | 06192616 | 7/1994 |
| JP | 06200187 | 7/1994 |
| JP | 06240203 | 8/1994 |
| JP | 07070987 | 3/1995 |
| JP | 07228813 | 8/1995 |
| JP | 07228814 | 8/1995 |
| JP | 07268114 | 10/1995 |
| JP | 08013342 | 1/1996 |
| JP | 10017688 | 1/1998 |
| JP | 10060395 | 3/1998 |
| JP | 10120965 | 5/1998 |
| JP | 10176134 | 6/1998 |
| JP | 10183015 | 7/1998 |
| JP | 10219156 | 8/1998 |
| JP | 11165052 | 6/1999 |
| JP | 11172160 | 6/1999 |
| JP | 11269410 | 10/1999 |
| JP | 11293081 | 10/1999 |
| JP | 11293195 | 10/1999 |
| JP | 2000119560 | 4/2000 |
| JP | 2000210604 | 8/2000 |
| JP | 2000248208 | 9/2000 |
| WO | 97 42130 | 11/1997 |
| WO | WO 2000024786 | 5/2000 |
| WO | WO 2000061697 | 10/2000 |

* cited by examiner

METHODS OF DRYING OPTICAL FIBER COATINGS

BACKGROUND OF THE INVENTION

1. Field of the Invention

The present invention relates generally to manufacturing optical fibers, and particularly to a process for drying optical fiber coatings.

2. Technical Background

Optical fibers have acquired an increasingly important role in the field of communications, frequently replacing existing copper wires. This trend has had a significant impact in the local area networks (i.e., for fiber-to-home uses), which has seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business environments for internal data, voice, and video communications has begun and is expected to increase.

Optical fibers typically contain a glass core, a cladding, and at least two coatings, e.g., a primary (or inner) coating and a secondary (or outer) coating. The primary coating is applied directly to the glass fiber and, when cured, forms a soft, elastic, and compliant material which encapsulates the glass fiber. The primary coating serves as a buffer to cushion and protect the glass fiber core when the fiber is bent, cabled, or spooled. The secondary coating is applied over the primary coating and functions as a tough, protective outer layer that prevents damage to the glass fiber during processing and use.

Certain characteristics are desirable for the primary coating, and others for the secondary coating. The modulus of the primary coating must be sufficiently low to cushion and protect the fiber by readily relieving stresses on the fiber, which can induce microbending and consequently attenuate signal transmission. This cushioning effect must be maintained throughout the fiber's lifetime.

Because of differential thermal expansion properties between the primary and secondary coatings, the primary coating must also have a glass transition temperature ($T_g$) which is lower than the foreseeable lowest temperature exposed to the fiber during use. This enables the primary coating to remain elastic throughout the useful life of the fiber and prevent microbending.

It is important for the primary coating to have a refractive index which is different (i.e., higher) than the refractive index of the cladding. This difference in refractive index creates a refractive index differential between the cladding and the primary coating that allows errant light signals to be refracted away from the glass core.

Also, the primary coating must maintain adequate adhesion to the glass fiber during thermal and hydrolytic aging, yet be strippable therefrom for splicing purposes. Moisture resistance is essential for adequate adhesion and strippability because moisture affects the adhesion of the primary coating to the glass. Poor adhesion can result in microbending and/or various sized delaminations, which can be significant sources of attenuation in the optical fiber. To provide adequate adhesion during thermal and hydrolytic aging many primary coating compositions include adhesion promoters which facilitate adhesion of the primary coating to the glass fiber. Maintaining good adhesion of the primary coating to the glass cladding of the fiber is desired in order to ensure good attenuation performance.

A number of suitable adhesion promoters have been described in the art, including acid-functional materials and organofunctional halo-silanes or alkoxy-silanes. Of these, organofunctional silanes are preferred, because such silanes are less corrosive and coatings incorporating such silanes tend to better maintain their adhesive properties. Organofunctional silanes particularly provide adequate adhesion during thermal and hydrolytic aging. Suitable organofunctional silanes which have been described in the art include, generally, amino-functional silanes, mercapto-functional silanes, methacrylate-functional silanes, acrylamido-functional silanes, allyl-functional silanes, vinyl-functional silanes, and acrylate-functional silanes. Organofunctional silanes react with moisture/water within the coating and become activated to react with a siliceous surface or other activated silanes.

Coating raw materials can contain significant amounts of moisture/water and can lead to formulated liquid coatings with high water content. The water in the coating may react prematurely with the organofunctional silanes and thus allowing for self condensation of the silanes, which in turn can lead to a reduced shelf life of the coating and poor adhesion between at least one of the coatings and the optical fiber.

A need remains to control the reaction of the organofunctional silanes such that the silanes react with the glass cladding to create an adhesion between the cladding and the primary coating. The present invention is directed to overcoming at least this deficiency in the art.

SUMMARY OF THE INVENTION

The present invention relates to a method of drying an optical fiber coating. The method includes blending a plurality of raw materials capable of forming an optical fiber coating and dehydrating the plurality. One embodiment of the method includes drying the optical fiber coating by passing a dehydrating medium over a top surface of a body of the plurality of materials. A second embodiment of the invention includes bubbling a dehydrating medium through the body of the plurality of raw materials. In a third embodiment of the invention, the plurality is dehydrated by reacting the water in the plurality with a dehydrating medium that includes a compound having a functional group that is capable of reacting with the water.

One advantage of practicing the invention is that the adhesion between the coating and the optical fiber is increased. Increasing the adhesion between the coating and the fiber will reduce microdelamination of the coating and decrease any attenuation exhibited by the fiber associated with microbending. One excellent environment in which the reduction in microdelamination will be exhibited is a wet environment. One example of a wet environment is fiber exposed to water or high humidity conditions.

Another advantage which will result from practicing the invention is that the amount of moisture in the coating will be reduced to an amount less than the amount required to cause permanent degradation of the coating. An additional advantage that will result from practicing the invention is that the optical fiber coatings can be manufactured with a consistent moisture level. Also a coating dried in accordance with the invention will exhibit a longer shelf-life than an undried coating.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
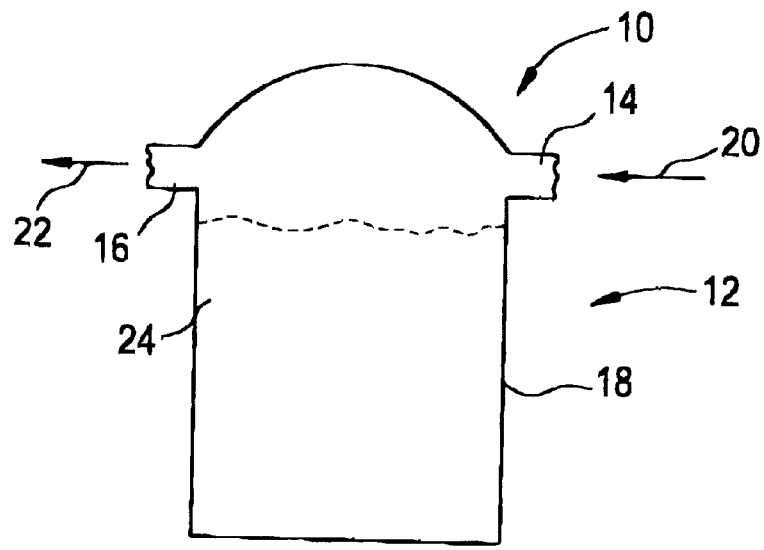
FIG. 1 is a schematic cross sectional view of one embodiment of the invention.

Reference will now be made in detail to the present preferred embodiments of the invention, examples of which are illustrated in the accompanying drawings. Wherever possible, the same reference numbers will be used throughout the drawings to refer to the same or like parts. Also the term moisture and water are used interchangeably. An exemplary embodiment of a method of drying an optical fiber in accordance with the present invention is shown in FIG. 1, and is designated generally throughout by reference numeral 10.

The present invention for a method of drying an optical fiber coating includes blending a plurality of raw materials and dehydrating the plurality. Preferably, the coating is capable of forming an optical fiber coating. Optical fiber coating raw materials have been found to have an "as received" moisture content of at least more than about 500 to more than about 2000 ppm of water. "As received" means the water content of a raw material when it is received from a supplier. Moisture and water are used herein interchangeably. It is preferred in dehydrating the coatings, the moisture content is lowered to at least about 500 ppm or less more preferably the coating composition has a moisture content of about 500 ppm or less before the composition was cured. Most preferably the composition has a moisture content of about 500 ppm or less before the composition is applied to an optical fiber.

It is preferred that the dehydrating step includes contacting the plurality with a dehydrating medium. Examples of a preferred dehydrating medium include dry air, nitrogen ($N_2$), $CO_2$, or another medium that is capable of absorbing water. It is preferred that the dry air contains no more than about 10 ppm of water, more preferably no more than about 5 ppm, and most preferably no more than about 3 ppm. The dry air may be available from Airgas, of Radnor, Pa. Alternatively, the dry air may be produced from passing ambient air through an anhydrous environment containing a drying agent such as Drierite. The term air is used herein to describe a fluid that may contain up to about 95% by weight of nitrogen or up to about 50% by weight of oxygen.

Examples of suitable drying agents include hygroscopic solids (such as calcium sulfate, calcium chloride, silica gel), concentrated sulfuric acid, or combinations thereof. One source of suitable drying agents is Hammonds Drierite of Xenia, Ohio. The drierite may be stored in any type of suitable reactor that will allow the drierite to absorb moisture from the ambient air. The flowrate of ambient air that is passed over the drierite will depend on the rate at which the drierite is able to absorb the moisture from the ambient air and the desired reduction in the humidity level of the ambient air. However, the invention is not limited to the use of dry air. The dehydrating medium may be any type of material that is capable of absorbing moisture from another body as the medium comes in contact with the body.

Optionally, the method may also include the step of forming the plurality into an optical fiber coating. The plurality can be formed into an optical fiber coating by blending the plurality at a temperature between about 40° C. to about 70° C., preferably between about 50° C. to about 60° C. Preferably, the blending is continued until the plurality is thoroughly mixed to yield a composition having a viscosity suitable for use in standard commercial coating operations, generally between about 50 to about 150 poise at a temperature of about 25° C. or between about 5 to about 15 poise at coating application temperature. Additional optional steps may include heating the plurality or cooling the plurality and applying the coating to an optical fiber. The fiber coating may be a primary coating (a.k.a. inner primary coating) or a secondary coating (a.k.a. outer primary coating).

A suitable primary coating is a UV curable acrylate resin. Preferably, the coating is not a thermoplastic resin or a thermoset resin. The primary coating will typically include at least one oligomer that is capable of being polymerized, preferably an oligomer that is capable of addition polymerization, at least one monomer suitable to control viscosity, a photoinitiator, and various other additives such as an adhesion promoter.

A preferred component of the primary coating composition of the present invention is the oligomer. Preferably the oligomer is an ethylenically unsaturated oligomer, more preferably a (meth)acrylate oligomer. By (meth)acrylate, it is meant an acrylate or a methacrylate. The (meth)acrylate terminal groups in such oligomers may be provided by a monohydric poly(meth)acrylate capping component, or by a mono(meth)acrylate capping component such as 2-hydroxyethyl acrylate, in the known manner. It is also preferred that the oligomer is capable of participating in addition polymerization.

Urethane oligomers are conventionally provided by reacting an aliphatic or aromatic diisocyanate with a dihydric polyether or polyester, most typically a polyoxyalkylene glycol such as a polyethylene glycol. Such oligomers typically have 4–10 urethane groups and maybe of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., the specifications of which are hereby incorporated by reference, describe such syntheses of the oligomers in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2–250 carbon atoms and, preferably, are substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

Polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

Thus, it is desirable for the primary coating composition of the present invention to contain at least one ethylenically unsaturated oligomer, although more than one oligomer component can be introduced into the composition. Preferably, the oligomer(s) is present in an amount between about 10 to about 90 percent by weight, more preferably between about 35 to about 75 percent by weight, and most preferably between about 40 to about 65 percent by weight.

Suitable ethylenically unsaturated oligomers for primary coatings include polyether urethane acrylate oligomers (e.g., CN986 available from Sartomer Company, Inc., (West Chester, Pa.)) and BR3731 and STC3-149 available from Bomar Specialty Co. (Winstead, Conn.)), acrylate oligomers based on tris(hydroxyethyl)isocyanurate, (available from Sartomer Company, Inc.), (meth)acrylated acrylic oligomers, (available from Cognis (Ambler, Pa.), polyester urethane acrylate oligomers (e.g., CN966 and CN973 available from Sartomer Company, Inc. and BR7432 available from Bomar Specialty Co.), polyurea urethane acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., all of which are hereby incorporated by reference), polyether acrylate oligomers (e.g., Genomer 3456 available from Rahn AG (Zurich, Switzerland), polyester acrylate oligomers (e.g., Ebecryl 80, 584, and 657 available from UCB Radcure (Atlanta, Ga.)), polyurea acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., the specifications of which are hereby incorporated by reference), epoxy acrylate oligomers (e.g., CN120 available from Sartomer Company, Inc., and Ebecryl 3201 and 3604 available from UCB Radcure), hydrogenated polybutadiene oligomers (e.g., Echo Resin MBNX available from Echo Resins and Laboratory (Versailles, Mo.)), and combinations thereof.

Furthermore, the coating compositions of the invention will typically include at least one monomer component. Preferably, the monomer is an ethylenically unsaturated monomer, more preferably a (meth)acrylate monomer. Generally, suitable monomers are those for which the resulting homopolymer would have a glass transition temperature ($T_g$) of at most about 20° C., preferably at most about 10° C. Generally, a lower molecular weight (i.e., about 120 to 600) liquid (meth)acrylate-functional monomer is added to the formulation to provide the liquidity needed to apply the coating composition with conventional liquid coating equipment. Typical acrylate-functional liquids in these systems include monofunctional and polyfunctional acrylates (i.e., monomers having two or more acrylate functional groups).

Illustrative of these polyfunctional acrylates are the difunctional acrylates, which have two functional groups; the trifunctional acrylates, which have three functional groups; and the tetrafunctional acrylates, which have four functional groups. Monofunctional and polyfunctional methacrylates may also be employed.

When it is desirable to utilize moisture-resistant components, the monomer component will be selected on the basis of its compatibility with the selected moisture-resistance oligomer. For satisfactory coating compatibility and moisture resistance, it is desirable to use a liquid acrylate monomer component comprising a predominantly saturated aliphatic mono- or di-acrylate monomer or alkoxy acrylate monomers.

Thus, it is desirable for the primary coating composition to contain at least one ethylenically unsaturated monomer, although more than one monomer can be introduced into the composition. Preferably, the ethylenically unsaturated monomer is present in an amount between about 10 to about 90 percent by weight, more preferably between about 20 to about 60 percent by weight, and most preferably between about 25 to about 45 percent by weight.

Suitable ethylenically unsaturated monomers include lauryl acrylate (e.g., SR335 available from Sartomer Company, Inc., Ageflex FA12 available from CPS Chemical Co. (Old Bridge, N.J.), and Photomer 4812 available from Cognis f.k.a. Henkel (Ambler, Pa.)), ethoxylatednonylphenol acrylate (e.g., SR504 available from Sartomer Company, Inc. and Photomer 4003 available from Cognis), caprolactone acrylate (e.g., SR495 available from Sartomer Company, Inc., and Tone M100 available from Union Carbide Company (Danbury, Conn.)), phenoxyethyl acrylate (e.g., SR339 available from Sartomer Company, Inc., Ageflex PEA available from CPS Chemical Co., and Photomer 4035 available from Cognis), isooctyl acrylate (e.g., SR440 available from Sartomer Company, Inc. and Ageflex FA8 available from CPS Chemical Co.), tridecyl acrylate (e.g., SR489 available from Sartomer Company, Inc.), phenoxyglycidyl acrylate (e.g., CN131 available from Sartomer Company, Inc.), lauryloxyglycidyl acrylate (e.g., CN130 available from Sartomer Company, Inc.), isobornyl acrylate (e.g., SR506 available from Sartomer Company, Inc. and Ageflex IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FA10 available from CPS Chemical Co.), 2-(2-ethoxyethoxy)ethyl acrylate (e.g., SR256 available from Sartomer Company, Inc.), and combinations thereof.

Optical fiber coating compositions may also contain a polymerization initiator which is suitable to cause polymerization (i.e., curing) of the composition after its application to a glass fiber. Polymerization initiators suitable for use in the primary coating compositions of the present invention include thermal initiators, chemical initiators, electron beam initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, must provide reasonable cure speed without causing premature gelation of the coating composition. A desirable cure speed is any speed sufficient to cause substantial curing of the coating materials. As measured in a dose versus modulus curve, a cure speed for coating thicknesses of about 25–35 µm is, e.g., less than 1.0 J/cm$^2$, preferably less than 0.5 J/cm$^2$.

Suitable photoinitiators include 1-hydroxycyclohexylphenyl ketone (e.g., Irgacure 184 available from Ciba Specialty Chemical (Hawthorne, N.Y.), (2,6-dimethoxybenzoyl)-2,4,4-trimethylpentyl phosphine oxide (e.g., commercial blends Irgacure 1800, 1850, and 1700 available from Ciba Specialty Chemical), 2,2-dimethoxyl-2-phenyl acetophenone (e.g., Irgacure 651, available from Ciba Specialty Chemical), bis(2,4,6-trimethyl benzoyl)phenyl-phosphine oxide (Irgacure 819), (2,4,6-trimethylbenzoyl)diphenyl phosphine oxide (Lucerin TPO, available from BASF (Munich, Germany)), ethoxy (2,4,6-trimethylbenzoyl)phenyl phosphine oxide (Lucerin TPO-L from BASF), and combinations thereof.

The coating composition may also include an adhesion promoter. It is preferred that the adhesion promoter includes a compound containing a cyclic structure interposed between at least two reactive silanes which are independently an alkoxysilane or a halosilane.

The cyclic structure can be a hydrocarbon cyclic structure or a heterocyclic structure or a combination thereof. Hydrocarbon cyclic structures and heterocyclic structures can be single-ring, fused-ring, or multi-ring structures, with or without hydrocarbon or hetero-substituents. Suitable hydrocarbon cyclic structures include, but are not limited to, cycloalkanes, preferably containing between 3 to 10, more preferably 5 to 6 carbon atoms per cyclic structure; cycloalkenes, preferably containing between 3 to 10, more preferably 5 to 6 carbon atoms per cyclic structure; cycloalkyldienes, preferably containing between 3 to 10, more preferably 5 to 6 carbon atoms per cyclic structure; substituted aliphatic rings; aromatic rings; and substituted aromatic rings. Preferably the hydrocarbon cyclic structure is an aromatic ring or a substituted aromatic ring. Exemplary hydrocarbon cyclic structures include, but are not limited to, benzene, naphthalene, cyclohexane, cyclohexene, etc. Suitable heterocyclic structure include those which contain oxygen, nitrogen, sulfur, or phosphorous hetero atom(s) within the ring structure. Exemplary heterocyclic structures include, but are not limited to, pyridines, pyrroles, imidazoles, indoles, pyrimidines, pyrrolidines, piperidines, furans, thiophenes, etc.

The at least two reactive silanes can independently be an alkoxysilane, a dialkoxysilane, a trialkoxysilane or any other suitable polyalkoxysilane, a halosilane, a dihalosilane, or a trihalosilane. Preferably, the at least two reactive silanes are independently dialkoxysilanes, trialkoxysilanes, or trihalosilanes. Suitable alkoxysilanes, polyalkoxysilanes, dialkoxysilanes, and trialkoxysilanes include alkoxy groups independently having between 1 and 6 carbon atoms. A preferred halosilane is a chlorosilane, more preferably a trichlorosilane.

The compound can also include a substituent interposed between the cyclic structure and one (or more) of the at least two alkoxysilanes. Suitable substituents include straight-chain alkylene groups having between 1 and 12 carbon atoms; branched-chain alkylene groups having between 1 and 12 carbon atoms; straight and branched-chain alkylene groups having a heterogroup; and a heterogroup including, but not limited to, oxygen, nitrogen, sulfur, phosphorous, selenium, titanium, zirconium, and silicon.

Preferred compounds include bis(trimethoxysilylethyl)benzene and bis(triethoxysilylethyl)benzene. Bis(trimethoxysilylethyl)benzene is commercially available from Gelest (Tellytown, Pa.) and United Chemical Technologies, Inc. (Bristol, Pa.). Bis(triethoxysilylethyl)benzene can be synthesized from bis(trimethoxysilylethyl)benzene by esterification with chloro-silanes.

Preferably the adhesion promoter is present in an amount between about 0.1 to about 10 parts per hundred, more preferably between about 0.25 to about 4 parts per hundred, most preferably between about 0.5 to about 3 parts per hundred.

As used herein, the weight percent of a particular component refers to the amount introduced into the bulk composition excluding the adhesion promoter and other additives. The amount of adhesion promoter and various other additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of adhesion promoter, for example 1.0 part per hundred, is introduced in excess of the 100 weight percent of the bulk composition.

In addition to the above-described components, the primary coating composition of the present invention can optionally include any number of additives, such as reactive diluents, antioxidants, catalysts, lubricants, co-monomers, low molecular weight non-crosslinking resins, and stabilizers. Some additives (e.g. chain transfer agents, for example) can operate to control the polymerization process, thereby affecting the physical properties (e.g., modulus, glass transition temperature) of the polymerization product formed from the primary coating composition. Others can affect the integrity of the polymerization product of the primary coating composition (e.g., protect against de-polymerization or oxidative degradation).

A preferred catalyst is a tin-catalyst, which is used to catalyze the formation of urethane bonds in some oligomer components. Whether the catalyst remains as an additive of the oligomer component or additional quantities of the catalyst are introduced into the composition of the present invention, the presence of the catalyst can act to stabilize the oligomer component in the composition.

A preferred antioxidant is thiodiethylene bis(3,5-di-tert-butyl)-4-hydroxyhydrocinnamate (e.g., Irganox 1035, available from Ciba Specialty Chemical).

A preferred co-monomer is the polar monomer N-vinyl-pyrrolidone available from International Specialty Products (Wayne, N.J.).

Another aspect of the present invention relates to a composition that contains an oligomer capable of being polymerized, a monomer suitable to control the viscosity of the composition, an adhesion promoter that includes a compound containing a reactive silane, and a carrier.

The carrier is preferably a carrier which functions as a carrier surfactant or ambiphilic reactive or non-reactive surfactant. Reactive surfactants which are partially soluble or insoluble in the composition are particularly preferred. Without being bound to a particular theory, it is believed that carriers which function as reactive surfactants interact with the compound containing a reactive silane by depositing such compounds on the glass fiber, where it is allowed to react. It is desirable for the carrier to be present in an amount between about 0.01 to about 10 parts per hundred, more preferably about 0.25 to about 3 parts per hundred.

Suitable carriers, more specifically carriers which function as reactive surfactants, include polyalkoxypolysiloxanes. A preferred carrier is available from Goldschmidt Chemical Co. (Hopewell, Va.) under the tradename Tegorad 2200, and reactive surfactant Tegorad 2700 (acrylated siloxane) also from Goldschmidt Chemical Co.

Other classes of suitable carriers are polyols and non-reactive surfactants. Examples of suitable polyols and non-reactive surfactants include polyol Aclaim 3201 (poly(ethylene oxide-co-propylene oxide)) available from Bayer (formerly known as Lyondel), Newtown Square, Pennsylvania, and non-reactive surfactants Tegoglide 435 (polyalkoxy-polysiloxane) available from Goldschmidt Chemical Co. The polyol or non-reactive surfactants may be present in a preferred amount between about 0.01 pph to about 10 pph. Suitable carriers may also be ambiphilic molecules. An ambiphilic molecule is a molecule that has both hydrophilic and hydrophobic segments. The hydrophobic segment may alternatively be described as a lipophilic (fat/oil loving) segment.

A tackifier is also an example of a suitable carrier. A tackifier is a molecule that can modify the time-sensitive rheological property of a polymer product. In general a tackifier additive will make a polymer product act stiffer at higher strain rates or shear rates and will make the polymer product softer at low strain rates or shear rates. A tackifier is an additive commonly used in the adhesives industry, that enhances the ability of a coating to create a bond with an object that the coating is applied upon. For additional background regarding tackifiers and tackifier resins, the *Handbook of Pressure Sensitive Adhesive Technology*, $3^{rd}$ Edition, (Warwick, R.I.) (1999) is incorporated herein by reference, see pages 36, 37, 57–61, 169, 173, 174, and 609–631.

Preferred tackifiers are those classified as a terpene base resin, coumarone base resin, petroleum resin, hydrogenated petroleum resin, styrene resin, phenol resins, or rosin base resin. It is preferred that the tackifiers are nonepoxidized. The rosin base resins include unmodified rosin (e.g., wood, gum, or tall oil) and rosin derivatives. Rosin base resins can be classified by their rosin acids, which are either an abietic acid or a pimaric acid. Abietic acid type rosins are preferred. Rosin derivatives include polymerized rosin, disproportionated rosin, hydrogenated rosin, and esterified rosin. Representative examples of such rosin derivatives include pentaerythritol esters of tall oil, gum rosin, wood rosin, or mixtures thereof.

The terpene base resins include terpene polymers of α-pinene, β-pinene, dipentel, limonene, myrcene, bornylene and camphene, and phenol-modified terpene base resins obtained by modifying these terpene base resins with phenols.

The coumarone base resins include, for example, coumarone-indene resins and phenol-modified coumarone-indene resins.

Petroleum and hydrogenated petroleum resins include aliphatic petroleum resins, alicyclic petroleum resins, aromatic petroleum resins using styrene, α-methylstyrene, vinyltoluene, indene, methylindene, butadiene, isoprene, piperylene and pentylene as raw materials, and homopolymers or copolymers of cyclopentadiene. The petroleum resins are polymers using fractions having a carbon number of 5 to 9 as main components.

The styrene base resins include homopolymers which are low molecular weight polymers comprising styrene as a principal component, and copolymers of styrene with, for example, α-methylstyrene, vinyltoluene, and butadiene rubber.

The phenol base resins include reaction products of phenols such as phenol, cresol, xylenol, resorcinol, p-tert-butylphenol, and p-phenylphenol with aldehydes such as formaldehyde, acetaldehyde and furfural, and rosin-modified phenol resins.

A more preferred tackifier is Uni-tac® R-40 (hereinafter "R-40") available from International Paper Co., Purchase, N.Y. R-40 is a tall oil rosin, which contains a polyether segment, and is from the chemical family of abietic esters. Preferably, the tackifier is present in the composition in an amount between about 0.01 to about 10 parts per hundred, more preferred in the amount between about 0.05 to about 10 parts per hundred. A suitable alternative tackifier is the Escorez series of hydrocarbon tackifiers available from Exxon. For additional information regarding Escorez tackifiers, U.S. Pat. No. 5,643,665 is hereby incorporated by reference in its entirety. The aforementioned carriers may also be used in combination.

Preferably the adhesion promoter used in combination with the tackifier carrier is a poly(alkoxy)silane. However, the invention is not limited to only a poly(alkoxy)silane adhesion promoter in combination with a tackifier carrier. A preferred poly(alkoxy)silane adhesion promoter is bis(trimethoxysilylethyl)benzene. It is also preferred that the poly(alkoxy)silane adhesion promoter is present in the composition in an amount between 0.1 to 10 pph.

Although the adhesion promoter can be any adhesion promoter that includes a compound with a reactive silane, preferably it is an adhesion promoter as described above (i.e., including a compound containing a cyclic structure interposed between at least two reactive silanes, which are independently alkoxysilanes or halosilanes). Other suitable adhesion promoters are described in U.S. Pat. Nos. 4,921,880 and 5,188,864 to Lee et al., which are hereby incorporated by reference.

Reference is made to U.S. patent application Ser. No. 09/476,151, filed Dec. 30, 1999, the specification of which is incorporated herein by reference as though fully set forth in its entirety, for a more detailed explanation of the adhesion promoter.

The secondary coating material is typically the polymerization (i.e., cured) product of a coating composition that contains urethane acrylate liquids whose molecules become cross-linked when polymerized. Other suitable materials for use in secondary coating materials, as well as considerations related to selection of these materials, are well known in the art and are described in U.S. Pat. Nos. 4,962,992 and 5,104,433 to Chapin, the specifications of which are hereby incorporated by reference. Various additives that enhance one or more properties of the coating can also be present, including the above-mentioned additives incorporated in the compositions of the present invention.

Typical secondary coatings will include at least one UV curable monomer and at least one photoinitiator. The secondary coating may also include at least one UV curable oligomer. It is preferred that the secondary coating is not a thermoplastic resin. Preferably, both the monomer and the oligomer are compounds capable of participating in addition polymerization. The monomer or the oligomer may be the major component of the secondary coating. An example of a suitable monomer is an ethylenically unsaturated monomer. Ethylenically unsaturated monomers may contain various functional groups, which enable their cross-linking. The ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers).

In general, individual monomers capable of about 80% or more conversion (i.e., when cured) are more desirable than those having lower conversion rates. The degree to which monomers having lower conversion rates can be introduced into the composition depends upon the particular requirements (i.e., strength) of the resulting cured product. Typically, higher conversion rates will yield stronger cured products.

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Cognis Corp. (Ambler, PA)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Cognis Corp., and SR499, Sartomer Company, Inc.), propoxylated trimethylolpropane triacrylate with propoxylation being 3 or greater, preferably ranging from 3 to 30 (e.g., Photomer 4072, Cognis Corp. and SR492, Sartomer), and ditrimethylolpropane tetraacrylate (e.g., Photomer 4355, Cognis Corp.); alkoxylated glyceryl triacrylates such as propoxylated glyceryl triacrylate with propoxylation being 3 or greater (e.g., Photomer 4096, Cognis Corp. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Cognis Corp., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether (4 up) and the like (e.g., Photomer 3016, Cognis Corp.); and single and multi-ring cyclic aromatic or non-aromatic polyacrylates such as dicyclopentadiene diacrylate and dicyclopentane diacrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4003, Cognis Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleic acid ester and fumaric acid ester.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride.

As indicated above, an optional constituent of the secondary coating composition is the oligomeric component. The oligomeric component can include a single type of oligomer or it can be a combination of two or more oligomers. When employed, if at all, the oligomeric component introduced into the compositions of the present invention preferably comprises ethylenically unsaturated oligomers When employed, suitable oligomers can be either monofunctional oligomers or polyfunctional oligomers, although polyfunctional oligomers are preferred. The oligomeric component can also be a combination of a monofunctional oligomer and a polyfunctional oligomer.

Di-functional oligomers preferably have a structure according to formula (I) below:

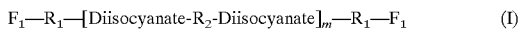

$$F_1-R_1-[\text{Diisocyanate-}R_2\text{-Diisocyanate}]_m-R_1-F_1 \qquad (I)$$

where $F_1$ is independently a reactive functional group such as acrylate, methacrylate, acrylamide, N-vinyl amide, styrene, vinyl ether, vinyl ester, or other functional group known in the art; $R_1$ includes independently $-C_{2-12}-$, $-(C_{2-4}-O)_n-$, $-C_{2-12}O-(C_{2-4}-O)_n-$, $-C_{2-12}O-(CO-C_{2-5}O)_n-$, or $-C_{2-12}O-(CO-C_{2-5}NH)_n-$ where n is a whole number from 1 to 30, preferably 1 to 10; $R_2$ is polyether, polyester, polycarbonate, polyamide, polyurethane, polyurea, or combinations thereof; and m is a whole number from 1 to 10, preferably 1 to 5. In the structure of formula I, the diisocyanate group is the reaction product formed following bonding of a diisocyanate to $R_2$ and/or $R_1$.

Other polyfunctional oligomers preferably have a structure according to formula (II) or formula (III) as set forth below:

$$\text{multiisocyanate-}(R_2-R_1-F_2)_x \quad (II)$$

or $$\text{polyol-}[(\text{diisocyanate-}R_2\text{-diisocyanate})_m-R_1-F_2]_x \quad (III)$$

where $F_2$ independently represents from 1 to 3 functional groups such as acrylate, methacrylate, acrylamide, N-vinyl amide, styrene, vinyl ether, vinyl ester, or other functional groups known in the art; $R_1$ can include —$C_{2\text{-}12}$O—, —($C_{2\text{-}4}$—O)$_n$—, —$C_{2\text{-}12}$O—($C_{2\text{-}4}$—O)$_n$—, —$C_{2\text{-}12}$O—(CO—$C_{2\text{-}5}$O)$_n$—, or —$C_{2\text{-}12}$O—(CO—$C_{2\text{-}5}$NH)$_n$— where n is a whole number from 1 to 10, preferably 1 to 5; $R_2$ can be polyether, polyester, polycarbonate, polyamide, polyurethane, polyurea or combinations thereof; x is a whole number from 1 to 10, preferably 2 to 5; and m is a whole number from 1 to 10, preferably 1 to 5. In the structure of formula II, the multiisocyanate group is the reaction product formed following bonding of a multiisocyanate to $R_2$. Similarly, the diisocyanate group in the structure of formula III is the reaction product formed following bonding of a diisocyanate to $R_2$ and/or $R_1$.

Urethane oligomers are conventionally provided by reacting an aliphatic diisocyanate with a dihydric polyether or polyester, most typically a polyoxyalkylene glycol such as a polyethylene glycol. Such oligomers typically have between about four to about ten urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., the specifications of which are hereby incorporated by reference to describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from about 2–250 carbon atoms and, preferably, are substantially free of ether or ester groups.

Polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently nonpolar and saturated as to avoid compromising the moisture resistance of the system.

Optical fiber secondary coating compositions may also contain a polymerization initiator which is suitable to cause polymerization (i.e., curing) of the composition after its application to a glass fiber or previously coated glass fiber. Polymerization initiators suitable for use in the compositions of the present invention include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes about 0.5 to about 10.0 weight percent, more preferably about 1.5 to about 7.5 weight percent.

The photoinitiator, when used in a small but effective amount to promote radiation cure, must provide reasonable cure speed without causing premature gelation of the coating composition. A desirable cure speed is any speed sufficient to cause substantial curing (i.e., greater than about 90%, more preferably 95%) of the coating composition. As measured in a dose versus modulus curve, a cure speed for coating thicknesses of about 25–35 μm is, e.g., less than 1.0 J/cm$^2$, preferably less than 0.5 J/cm$^2$. It is preferred that the secondary coating composition contains about 10–90% of the monomer; of about 0–90% of the oligomer; and about 0.5–10% of the photoinitiator.

Suitable photoinitiators include, without limitation, 1-hydroxycyclohexylphenyl ketone (e.g., Irgacure 184 available from Ciba Specialty Chemical (Tarrytown, N.Y.)), (2,6-dimethoxybenzoyl)-2,4,4-trimethylpentyl phosphine oxide (e.g., in commercial blends Irgacure 1800, 1850, and 1700, Ciba Specialty Chemical), 2,2-dimethoxyl-2-phenyl acetophenone (e.g., Irgacure 651, Ciba Specialty Chemical), bis(2,4,6-trimethylbenzoyl)phenyl phosphine oxide (e.g., Irgacure 819, Ciba Specialty Chemical), (2,4,6-trimethylbenzoyl)diphenyl phosphine oxide (e.g., in commercial blend Darocur 4265, Ciba Specialty Chemical), 2-hydroxy-2-methyl-1-phenylpropane-1-one (e.g., in commercial blend Darocur 4265, Ciba Specialty Chemical) and combinations thereof. Other photoinitiators are continually being developed and used in coating compositions on glass fibers. Any suitable photoinitiator can be introduced into compositions of the present invention.

In addition to the above-described components, the secondary coating composition of the present invention can optionally include an additive or a combination of additives. Suitable additives include, without limitation, antioxidants, catalysts, lubricants, low molecular weight non-crosslinking resins, adhesion promoters, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation).

A preferred antioxidant is thiodiethylene bis(3,5-di-tert-butyl)-4-hydroxyhydrocinnamate (e.g., Irganox 1035, available from Ciba Specialty Chemical).

A preferred adhesion promoter is an acrylated acid adhesion promoter such as Ebecryl 170 (available from UCB Radcure (Smyrna Ga.)).

Other suitable materials for use in secondary coating materials, as well as considerations related to selection of these materials are described in U.S. Pat. Nos. 4,962,992 and 5,104,433 to Chapin, which are hereby incorporated by reference. Various additives that enhance one or more properties of the coating can also be present, including the above-mentioned additives incorporated in the compositions of the present invention.

Reference is made to U.S. patent application Ser. No. 60/173,874, filed Dec. 30, 1999, and Provisional U.S. patent application filed Jul. 26, 2000 by Botelho et al., titled Secondary Coating Compositions for Optical Fibers, the specifications of which are incorporated herein by reference as though fully set forth in its entirety, for a more detailed explanation of secondary coatings.

The adhesion promoter may be added to the primary coating during dehydrating of the plurality or after dehydrating. Preferably the adhesion promoter does not come in contact with any water until the coating is applied to an optical fiber. However, the invention is not limited to adding the adhesion promoter to only the primary coating. Likewise the adhesion promoter may be added to the secondary coating. The method may also include the step of storing the dried coating in a dry environment. A dry environment is an atmosphere with a relative humidity below about 50%, preferably below about 45%, more preferably below about 40%, and most preferably below about 35%.

Practicing the present invention will improve the shelf life of the optical fiber coating. For at least the reason the coating will have been dried and the coating will not contain water molecules to cause hydrolysis and a subsequent self condensation reaction of active silanes contained in the coating. By active silanes it is meant silanes that have at least partially hydrolyzed and assist in bond formation between the coating and the cladding of the fiber, where the silanols of the adhesion promoter may condense with silanols of the cladding glass surface to bond the coating to the cladding of the fiber. Preferably, the fiber coating is a primary coating.

As embodied herein, and depicted in FIG. 1, the invention may be practiced by charging a vessel 12 with a body 24 of a plurality of raw materials to form an optical fiber coating. Preferably, body 24 is capable of forming an optical fiber coating as described above. Vessel 12 has an inlet 14 and an outlet 16. It is preferred that inlet 14 and outlet 16 are positioned vertically above a top surface of body 24. Vessel 12 may also include a heat transfer jacket 18 around an outer surface of vessel 12. It is preferred that either a heating medium or a cooling medium may be circulated in jacket 18. A preferred heating medium is steam. Examples of a preferred cooling medium include water, glycol, or a refrigerant. Preferably, vessel 12 will include an agitator (not shown).

In the embodiment shown in FIG. 1, the dehydrating medium is passed over a top surface of body 24 in the direction of arrows 20 and 22. It is preferred that the dehydrating medium is dry air. It is also preferred that the dry is passed over body 24 for the entire time period of the blending. Preferably, for a vessel containing a body 24 of about 1000 kg, the dry air is passed over the top surface at a flowrate of at least about 20 scfh. (standard cubic feet per hour). It is more preferred that the dry air flowrate is at least about 40 scfh. However, the invention is not limited to only passing the dehydrating medium over the top surface of body 24 during blending. The dehydrating can occur subsequently to the blending step. Likewise, the individual raw materials, which form the plurality, may be dehydrated separately before blending.

The amount of moisture removed from a coating dried in accordance with the invention may depend on variables such as the flowrate of the dehydrating medium across the top surface, the water content of the coating, and the rate at which the medium absorbs water from the coating. For a coating containing about 2000 or more ppm of water, preferably, the dried coating may contain no more than about 500 ppm of water, more preferably no more than about 350 ppm of water, most preferably no more than about 150 ppm of water.

The amount of water in the coating is determined using a Mitsubishi Model CA-06 coulometric Karl-Fisher titrator supplied by Cosa Instrument Corp. (Norwood, N.J.). The coating samples are either analyzed directly or are diluted by a factor of two-to-three with methylene chloride prior to analysis. A blank correction must be applied to diluted samples. A glass gas-tight syringe is used to transfer 1–10 ml of the sample into the titration cell. The exact sample size used depends on the amount of water contained in the sample. Aquamicron AX reagent is used for the anode solution and Aquamicron CXU is used for the cathode reagent. The Aquamicron reagents are supplied by Cosa Instrument Corp. The reagent reacts rapidly and quantitatively with the water in the sample. The end point of the reaction is detected coulometrically.

Figure 2:
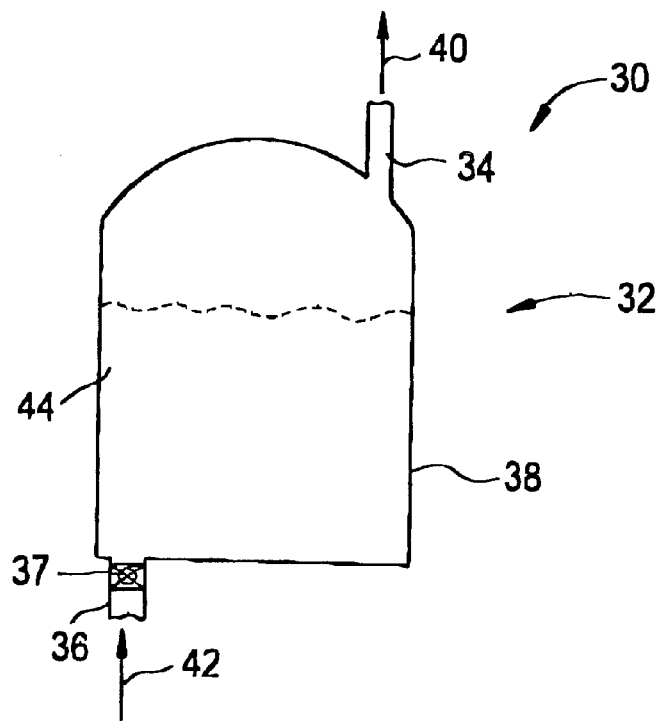
FIG. 2 is a schematic cross sectional view of a second embodiment of the invention.

In a second embodiment of the invention, as embodied herein in FIG. 2, vessel 32 has an outlet 34 in a top surface of vessel 32 and an inlet 36 in a bottom surface of vessel 32. It is preferred that a body 44 of a plurality of raw materials can not flow out of vessel 32 through inlet 36. In the embodiment shown, inlet 36 includes a one way valve 37. The vessel 32 includes a heat transfer jacket 38 the same as heat transfer jacket 18. Preferably, body 44 is capable of forming an optical fiber coating. In the embodiment shown in FIG. 2, the step of contacting the coating with a dehydrating medium includes bubbling the dry air through body 44. It is preferred that the bubbling occurs simultaneously to the blending. It is further preferred that the bubbling occurs during an entire period of time of the blending. In another embodiment, the bubbling may occur subsequently to the blending. Furthermore, it is preferred that the bubbling includes introducing the dry air into inlet 36 of vessel 32 containing the plurality and discharging the dehydrating medium out outlet 34 of vessel 32. When the dehydrating medium is discharged it is preferred that the dehydrating medium is saturated. In the case of the dry air dehydrating medium, saturated is used herein to describe air with a water content of more than about 10 ppm.

For the blending of body 44 shown in FIG. 2, the preferred flowrate of dry air into inlet 36 is 20 scfh. A more preferred flowrate is 40 scfh. An adhesion promoter may also be added to the body 44. Optionally, the promoter may added to body 44 during dehydrating or after dehydrating.

In this embodiment of the invention, it is preferred that a coating containing up to at least about 2000 ppm of water is dried to contain no more than 500 ppm of water, more preferably no more than 350 ppm of water, most preferably no more than 150 ppm of water. The amount of water in the coating is determined by the Karl-Fischer analysis as described above.

In another embodiment of the invention, the dehydrating medium is a compound having at least one functional group that is capable of quickly reacting with water. By quickly, it is meant that the reaction between the water and the dehydrating medium takes less than about 48 hours, preferably less than about 18 hours, more preferably less than about 1 hour, most preferably less than about 1 minute. An example of a functional group that will react with water is an isocyanate functional group (—NCO). Accordingly examples of preferred compounds include isocyanates and polyisocyanates. Examples of suitable isocyanates would include aliphatic and aromatic mono- or polyisocyanates. Examples of aliphatic isocyanates would include hexyl isocyanate, octyl isocyanate, octadecyl isocyanate, hexamethylene diisocyanate, 4,4'-methylenebis(cyclohexyl isocyanate), hexamethylene diisocyanate isocyanurate, and isophorone diisocyanate. Another example would be a mono- or polyisocyanate end-capped aliphatic oligomer, where the reactive functionality would be an isocyanate rather than an ethylenically unsaturated functional group. Examples of aromatic isocyanates would include phenyl isocyanate, 1-naphthyl isocyanate, 2-naphthyl isocyanate, toluene 2,4-diisocyanate, 4,4'-methylenebis(phenyl isocyanate), tetramethyl-m-xylidene diisocyanate, and p-toluenesulfonyl isocyanate. Another example would be a mono- or polyisocyanate end-capped aromatic oligomer, where the reactive functionality would be an isocyanate rather than an ethylenically unsaturated functional groups. The reaction of the isocyanate and water is as follows below:

$$R-NCO+H_2O \leftrightarrows R-NH_2+CO_2.$$

Preferably, the isocyanate compound is present in a stoichiometric amount at least equal to the amount of water in the plurality. From the above equation stoichiometric amount means that for every mole of water present, one mole of the isocyanate compound is present. More preferably, the isocyanate compound is present in an amount at least equal to twice the stoichiometric amount, meaning that for every mole of water present at least two moles of the isocyanate compound are present. Most preferably, the isocyanate compound is present in an amount greater than twice the stoichiometric amount, most preferably no more than about 1% greater than twice the stoichiometric amount.

Instead of isocyanates, other materials may be used to dry coatings. These would include organofunctional reactive silanes, anhydrides, acid chlorides, and esters. Organofunctional silanes would include organofunctional poly(alkoxy) silanes, and organofunctional poly(halo)silanes. These materials would be selected such that they would react "quickly" with water prior to the addition of other water sensitive materials.

In addition to the isocyanate, the dehydrating medium may optionally include a catalyst. Preferably, the catalyst will promote the reaction between the isocyanate and water instead of a reaction between the isocyanate and another compound in the plurality. Preferably, the catalyst is at least one catalyst selected from the group consisting of dibutyltin dilaurate, dibutyltin diacetate, dibutyltin oxide, amines, lead compounds, zinc salts, manganese salts, cobalt octanoate, zinc octanoate, bismuth octanoate, nickel diacetate, cobalt acetate, manganese octanoate, organic titanates (commercially available as Tyzor® from DuPont (Wilmington, Del.)), and mixtures thereof. It is preferred that the catalyst is present in about 1 pph or less, more preferably about 0.3 pph or less, most preferably about 0.15 pph or less.

In addition to the catalyst, the dehydrating medium may also include a compound having at least one hydroxyl (—OH) functional group. Examples of suitable compounds having at least one hydroxyl functional group include alcohols and polyols. More preferably, the hydroxyl functional compound is present in the dehydrating medium along with one of the aforementioned catalyst that promotes the reaction of the isocyanate and water instead of the reaction between the isocyanate and the hydroxyl functional compound. Preferably the catalyst is at least one of the following group of catalysts consisting of cobalt octanoate, zinc octanoate, bismuth octanoate, nickel diacetate, cobalt acetate, manganese octanoate, organic titanates, and mixtures thereof.

It is preferred that the hydroxyl functional compound is present in the dehydrating medium in an amount equal to the amount of isocyanate above the stoichiometric amount of water, e.g. a dehydrating medium having about 2.4 moles of an isocyanate compound and a plurality including only about 2.0 moles of water, preferably includes no more than about 0.4 moles of the hydroxyl functional compound. It is most preferred that residual isocyanate, meaning that isocyanate remaining after the reaction between the isocyanate and water, is completely reacted with the hydroxyl functional compound, such that no isocyanate is left in the system.

Preferably, the coating dried with a isocyanate dehydrating medium includes no more than about 150 ppm of water, more preferably no more than about 75 ppm of water, and most preferably no more than 40 ppm of water.

EXAMPLES

The invention will be further clarified by the following examples which are intended to be exemplary of the invention. The water content of each coating was determined in accordance with the Karl-Fischer analysis described above. In each example at least the coating listed in table 1-1 was sampled.

TABLE 1-1

|  | Compound | Concentration weight % or pph |
|---|---|---|
| Oligomer | BR 3731 | 52% |
| Monomer | Photomer 4003 | 45% |
| Photoinitiator | Irgacure 1850 | 3% |
| Antioxidant | Irganox 1035 | 1 pph |

The blending of the coating consisted of the oligomer and the monomer being charged into a glass vessel. Next, the vessel is heated to about 55° C. During the heating, the mixture was stirred. Then, the photoinitiator and the antioxidant were added to the mixture and the mixture was stirred to create a homogenous mixture. The above plurality was blended for at least about 60 minutes. The blending occurred in a vessel that shielded the plurality from UV light (light wavelengths of 420 nm or less).

Example 1

A coating sample of about 3000 grams was tested. The undried coating had a moisture content of about 1000 ppm. Ambient air was passed through a dehydrator, containing up to about 2 pounds of a calcium sulfate drying agent, to form dry air. The air was passed through the dehydrator at a rate of no more than about 40 scfh. Subsequently to blending, the dry air was passed over the top surface of the coating for a period of about eight hours while the coating was cooling to ambient temperature. The dried coating was found to have a water content of about 150 ppm.

Example 2

In example 2, a larger sample of the coating in example 1 was blended and dehydrated in a metal vessel. The sample size of the coating in example 2 was about 15,000 grams. The dehydrating medium was dry air. Ambient air was passed through a series of three dehydrators and a moisture trap to dry the ambient air. Each dehydrator contained a calcium sulfate drying agent. The moisture trap was a Drierite Laboratory Gas Drying Unit 26800 available from Hammond Drierite of Xenia, Ohio. The ambient air traveled through the dehydrators at the same rate as in example 1. The dry air was passed over a top surface of the coating during the blending process. The dried coating was found to have a water content of about 330 ppm.

Example 3

During the blending process of two coating samples of coating 1-1, commercially available dry air was bubbled through each coating, respectively. The dry air was bubbled through the coatings during the entire blending process of each coating and the air exited from the top of the reaction vessel. Each coating was found to have a water content of no more than about 500 ppm after drying.

Example 4

One coating was prepared without an adhesion promoter as set forth in table 1-1. A second coating having the formulation set forth in table 4-1 was also prepared.

TABLE 4-1

|  | Chemical | Concentration wt % or pph |
| --- | --- | --- |
| Oligomer | BR 3731 | 52% |
| Monomer | Photomer 4003 | 25% |
| Monomer | Tone M 100 | 20% |
| Photoinitiator | Irgacure 1850 | 3% |
| Antioxidant | Irganox 1035 | 1 pph |
| Carrier | Tegorad 2200 | 1 pph |
| Adhesion Promoter | Bis(trimethoxysilylethyl)benzene | 0.5 pph |

After each coating composition was blended, dry air was passed through each coating for a period of at least about 8 hours. The dry air was obtained from passing compressed air through a dehydrator with a calcium sulfate drying agent. After drying, the water content of each coating was analyzed (before addition of the adhesion promoter and the carrier). Next, the adhesion promoter of bis(trimethoxy silylethyl) benzene and Tegorad 2200 were premixed at a temperature of about 35° C. for at least about 60 minutes. The premixed additives were then added to the each coating after drying and the coating was cooled to a temperature of about 35° C. The coatings were then analyzed again. The concentration of the adhesion promoter and the carrier was the same as shown in table 4-1 in each coating. The results of the example are shown in table 4-2 below.

TABLE 4-2

| Coating | Water Before Drying (ppm) | Water After Drying (ppm) | Water After AP Added (ppm) |
| --- | --- | --- | --- |
| 1-1 | 960 | 130 | 20 |
| 4-1 | 1370 | 150 | 40 |

Example 5

Five 300 ml samples of the coating 1-1 were charged into 5 different reaction vessels. The moisture content of the coating was about 0.3%. Three samples of the coating were dried by charging each sample with about 8 ml of p-toluene sulfonyl isocyanate. The mixture of the coating and the isocyanate was stirred for about 30 minutes. The moisture content of the three test samples and two controls was determined in accordance with the Karl-Fischer analysis. The results are shown below in table 5-1.

TABLE 5-1

| Coating Sample | Moisture Content |
| --- | --- |
| Control | 880 ppm |
| Control | 1032 ppm |
| Isocyanate Dried | 59 ppm |
| Isocyanate Dried | 34 ppm |
| Isocyanate Dried | 30 ppm |

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of drying an optical fiber coating, the method comprising the steps of:
   blending a plurality of raw materials capable of forming an optical fiber coating; and
   dehydrating said plurality to a moisture content of about 500 ppm or less by contacting the plurality with a dehydrating medium comprising at least one compound having at least one isocyanate functional group.

2. The method of claim 1 wherein the dehydrating medium further comprises at least one catalyst selected from the group consisting of dibutylin dilaurate, dibutylin diacetate, dibutylin oxide, amines, lead compounds, zinc salts, manganese salts, cobalt octanoate, zinc octanoate, bismuth octanoate, nickel diacetate, cobalt acetate, manganese octanoate, organic titanate, and mixtures thereof.

3. The method of claim 1 wherein the dehydrating medium further comprises at least one compound selected from the group consisting of cobalt octanoate, zinc octanoate, bismuth octanoate, nickel diacetate, cobalt acetate, manganese octanoate, organic titanate, and mixtures thereof.

4. The method of claim 3 further comprising reacting a residual amount of the compound having at least one isocyanate functional group with a compound having at least one hydroxyl functional group after the compound having at least one isocyanate functional group has reacted with the water in the plurality.

5. The method of claim 1 wherein the compound having at least one isocyanate functional group comprises at least one compound selected from the group consisting of aliphatic monoisocyanate, aliphatic polyisocyanate, aromatic monoisocyanate, aromatic polyisocyanate, monoisocyanate end-capped aliphatic oligomer, polyisocyanate end-capped aliphatic oligomer, monoisocyanate end-capped aromatic oligomer, polyisocyanate end-capped aromatic oligomer, and mixtures thereof.

6. The method of claim 1 wherein the compound having at least one isocyanate functional group comprises at least one selected compound from the group consisting of hexyl isocyanate, octyl isocyanate, octadecyl isocyanate, hexamethylene diisocyanate, 4,4'-methylenebis(cyclohexyl isocyanate), hexamethylene diisocyanate isocyanurate, and isophorone diisocyanate, phenyl isocyanate, 1-naphthyl isocyanate, 2-naphthyl isocyanate, toluene 2,4-diisocyanate, 4,4'-methylenebis(phenyl isocyanate), tetramethyl-m-xylidene diisocyanate, and p-toluenesulfonyl isocyanate, and mixtures thereof.

7. The method of claim 1 wherein an amount of the compound having at least one isocyanate functional group present is at least equal to about the stoichiometric amount of water present in the plurality.

8. A method of drying an optical fiber coating, the method comprising the steps of:
   blending a plurality of raw materials capable of forming an optical fiber coating; and
   dehydrating said plurality to a moisture content of about 500 ppm or less by contacting the plurality with a dehydrating medium comprising at least one compound having a functional group capable of reacting with water quickly.

9. The method of claim 8 wherein the compound comprises at least one compound selected from the group consisting of aliphatic monoisocyanate, aliphatic polyisocyanate, aromatic monoisocyanate, aromatic polyisocyanate, monoisocyanate end-capped aliphatic oligomer, polyisocyanate end-capped aliphatic oligomer, monoisocyanate end-capped aromatic oligomer, polyisocyanate end-capped aromatic oligomer, anhydrides, acid chlorides, esters, and mixtures thereof.

10. The method of claim 8 wherein the reaction between the water and the dehydrating medium takes less than about 48 hours.

11. The method of claim 10 wherein the reaction between the water and the dehydrating medium takes less than about 1 hour.

* * * * *